United States Patent
Schmitt (10) Patent No.: US 10,159,020 B2
(45) Date of Patent: Dec. 18, 2018

(54) METHOD FOR FAST LINK LAYER HANDOFF IN HETEROGENEOUS NETWORKS

(75) Inventor: Ruediger Schmitt, Maplewood, NJ (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 836 days.

(21) Appl. No.: 13/635,989

(22) PCT Filed: Mar. 15, 2011

(86) PCT No.: PCT/IB2011/051079
§ 371 (c)(1),
(2), (4) Date: Sep. 19, 2012

(87) PCT Pub. No.: WO2011/124994
PCT Pub. Date: Oct. 13, 2011

(65) Prior Publication Data
US 2013/0022022 A1      Jan. 24, 2013

Related U.S. Application Data

(60) Provisional application No. 61/321,162, filed on Apr. 6, 2010.

(51) Int. Cl.
*H04W 36/08* (2009.01)
*H04W 36/00* (2009.01)
(52) U.S. Cl.
CPC ....... *H04W 36/0066* (2013.01); *Y02D 70/142* (2018.01)
(58) Field of Classification Search
None
See application file for complete search history.

(56) References Cited

U.S. PATENT DOCUMENTS 5,542,097 A  *  7/1996  Ward et al. ............. 455/437
6,778,830 B1      8/2004  Oizumi et al.
(Continued)

FOREIGN PATENT DOCUMENTS

EP       1942691 A1    7/2008
JP    2009284422 A   12/2009
(Continued)

OTHER PUBLICATIONS

Niyato, D., et al.; Integration of IEEE 802.11 WLANs with IEEE 802.16-based multihop infrastructure mesh/relay networks: A game-theoretic approach to radio resource management; 2007; IEEE Network; IEEE Service Center; 21(3)6-14.
(Continued)

*Primary Examiner* — Alex Skripnikov (57) ABSTRACT

When handing off a multi-mode patient monitoring device (PMD) (28) between radio access technology (RAT) networks, a serving access point (AP) (12, 16, 72) with which a communication link is established by the PMD (28) over a first RAT network (RAT-1) to permit the PMD to communicate with a hospital IP network (18) via the serving AP (12, 16, 72). A scanning interface (14, 54, 74, 104) collects information regarding other available RAT networks (e.g., RAT-2, RAT-3, etc) and candidate APs therein. If the RAT-1 communication quality of service falls below a predetermined threshold level, the serving AP (12, 16, 72) delivers information regarding the candidate APs (22, 24, 26) and their RAT networks to the PMD (28). Delivery of the candidate network/AP information is performed using a beacon signal continuously or periodically emitted from the serving AP (12, 16, 72), or upon request by the PMD (28). The PMD (28) selects a candidate AP (22, 24, 26) as a target AP, and initiates a handover to the target AP. In this manner, the PMD (28) is provided with candidate AP information
(Continued)

without having to actively search for the APs, thereby conserving battery power.

17 Claims, 5 Drawing Sheets

(56) References Cited

U.S. PATENT DOCUMENTS

| | | | |
|---|---|---|---|
| 7,586,876 B2 * | 9/2009 | Chung et al. | 370/331 |
| 8,351,375 B2 | 1/2013 | Lee et al. | |
| 2003/0179742 A1 * | 9/2003 | Ogier | H04L 1/1614 |
| | | | 370/351 |
| 2004/0196812 A1 * | 10/2004 | Barber | 370/334 |
| 2005/0025182 A1 * | 2/2005 | Nazari | H04W 88/06 |
| | | | 370/469 |
| 2005/0135306 A1 * | 6/2005 | McAllen | G06F 19/327 |
| | | | 370/329 |
| 2005/0239497 A1 * | 10/2005 | Bahl et al. | 455/552.1 |
| 2006/0040656 A1 | 2/2006 | Kotzin | |
| 2006/0073832 A1 | 4/2006 | Pfister | |
| 2008/0062933 A1 * | 3/2008 | Liu | H04W 48/12 |
| | | | 370/332 |
| 2008/0064435 A1 | 3/2008 | Hong | |
| 2009/0213819 A1 | 8/2009 | Kalhan | |

FOREIGN PATENT DOCUMENTS

| | | |
|---|---|---|
| KR | 2005020878 A | 3/2005 |
| KR | 2007121366 A | 12/2007 |
| WO | WO 2007138530 A2 * | 12/2007 |

OTHER PUBLICATIONS

Pawar, P., et al.; Context-Aware Computing Support for Network-Assisted Seamless Vertical Handover in Remote Patient Monitoring; 2009; IEEE Trans. on Advanced Information Networking and Applications; pp. 351-358.

Piri, E., et al.; IEEE 802.21; 2009; Cisco Systems: The Internet Protocol Journal; 12(2)1-11. https://www.cisco.com/web/about/ac123/ac147/archived_issues/ipj_12-2/122_ieee.html.

Shin, S., et al.; Reducing MAC Layer Handoff Latency in IEEE 802.11 Wireless LANs; 2004; MobiWac'04; 8 pages.

* cited by examiner

METHOD FOR FAST LINK LAYER HANDOFF IN HETEROGENEOUS NETWORKS

CROSS REFERENCE TO RELATED APPLICATIONS

This application claims the benefit of U.S. Provisional Application No. 61/321,162 filed Apr. 6, 2010, which is incorporated herein by reference.

The present innovation finds application in patient monitoring systems, particularly with regard to physiologic monitoring systems. However, it will be appreciated that the described techniques may also find application in other monitoring systems, other healthcare information collection scenarios, other status monitoring techniques, and the like.

A typical wireless patient monitoring system (PMS) includes: 1) one or more patient monitoring devices (PMD); 2) a patient information server (PIS); and, 3) a patient database server (PDS). The PMD, the PIS and the PDS are connected in A network topology. Typically, a hospital's IP network is a wired Ethernet network. The PIS and the PDS are connected to the wired hospital IP network. The wireless access network which connects the mobile PMD to the hospitals IP network may be based on proprietary or standardized local area network (LAN) technologies such as IEEE 802.11.

The PMD gathers a patient's physiological data (ECG, SpO2, etc.) and sends it to the PIS where the data is analyzed and displayed. The data from a patient may also be stored on a PDS. The data transmission from a patient monitor to the patient information display server traverses a wireless access network and the wired hospitals IP network. Life-critical patient monitoring systems are error-sensitive, i.e. they can only tolerate a small number of transmission errors, as well as delay-sensitive, i.e. they require data to be transmitted from the PMD to the PIS within a certain delay bound. A key performance requirement for PMDs is low power consumption, which allows PMDs to operate for long periods of time without the need to be recharged or have their batteries changed. Future hospital network deployments will provide more than one radio access technology at a given location and next generation PMDs will be equipped with multiple wireless communication interfaces, referred to herein as multi-mode PMDs, allowing these devices to connect to these heterogeneous access networks. The device based mechanism described by Shin et al. in "Reducing MAC Layer Handoff Latency in IEEE 802.11 Wireless LANs" (MobiWac'04, October 2004), while simple to implement, does not prevent time and energy intensive scanning for candidate networks due to outdated cache entries. While this mechanism may provide limited information about candidate networks such as access point channel and MAC address, it falls short of providing additional information such as network utilization, which would be critical for intelligent access network decisions.

While IEEE 802.21 provides an interesting framework for distribution of access network information its drawbacks for use in PMS include a lack of specification of the manner in which the information is gathered, and therefore the quality of the information is implementation dependent and may be insufficient. Another drawback is that its signaling overhead may require too much bandwidth for proprietary radio technologies. Additionally, IEEE 802.21 compliance increases power consumption, for example scan requests etc., which is detrimental to mobile patient monitoring devices.

The present application provides new and improved systems and methods for timely and energy efficient acquisition of accurate neighborhood access network information, which overcome the above-referenced problems and others.

As used herein, "serving" network denotes a network to which the PMD is currently connected, "candidate" networks denote the networks the PMD is evaluating as possible networks to handover to, and "target" network denotes a candidate network that the PMD has selected as the network to become the new serving network.

In accordance with one aspect, a method of transferring a patient monitoring device between radio access technology (RAT) networks comprises establishing a first communication link between a multi-mode patient monitoring device and a first access point over a first RAT network (RAT-1), wherein the patient monitoring device communicates with a hospital Internet protocol (IP) network via the first access point. The method further comprises collecting information regarding one or more other candidate networks (RAT-2) over which the patient monitoring device is capable of communicating with the hospital IP network, transmitting the candidate network information to the patient monitoring device, and establishing a second communication link between the patient monitoring device and a second access point for a target network.

In accordance with another aspect, a system that facilitates transferring a patient monitoring device between radio access technology (RAT) networks comprises a multimode patient monitoring device (PMD) that establishes a first communication link between with a first access point over a first RAT network (RAT-1), wherein the patient monitoring device communicates with a hospital Internet protocol (IP) network via the first access point. The system further comprises a scanning interface (SI) configured to collect availability information regarding one or more candidate networks (RAT-2) over which the patient monitoring device is capable of communicating with the hospital IP network, wherein the scanning interface is located remotely from the multi-mode patient monitoring device. The first access point relays candidate network information from the scanning interface to the patient monitoring device. This candidate network information is then used by the PMD to establish a second communication link to a target second access point.

In accordance with another aspect, an apparatus that facilitates transferring a patient monitoring device between radio access technology (RAT) networks comprises means for establishing and maintaining a first communication link using a first RAT network between a multi-mode patient monitoring device and a hospital Internet protocol (IP) network via the means for establishing and maintaining the first communication link. The apparatus further comprises means for collecting information regarding one or more candidate networks using a second radio access technology (RAT-2) over which the patient monitoring device is capable of communicating with the hospital IP network. Additionally, the apparatus comprises means for transmitting the candidate network information to the patient monitoring device, and means for establishing and maintaining a second communication link between the patient monitoring device and a second access point for the target network.

One advantage is that consistent quality of service is maintained for the patient monitoring device.

Another advantage resides in power savings for the patient monitoring device.

Still further advantages of the subject innovation will be appreciated by those of ordinary skill in the art upon reading and understanding the following detailed description.

The drawings are only for purposes of illustrating various aspects and are not to be construed as limiting.

To overcome the aforementioned problems, the described systems and methods pair an access point (AP) which uses a first radio access technology (RAT-1) with one or more wireless interfaces of a different radio access technology (RAT-2, RAT-3, etc.), henceforth called scanning interfaces (SIs). The role of a SI is to compile comprehensive information about RATs other than RAT-1 in the geographical vicinity of the AP. The information is provided to a multi radio PMD through its serving AP. This relieves the PMD from having to perform extensive scanning, thus reducing its power consumption, while providing up-to-date information to the PMD regarding other available networks to which the PMD may switch to ensure that patient monitoring is uninterrupted.

Figure 1:
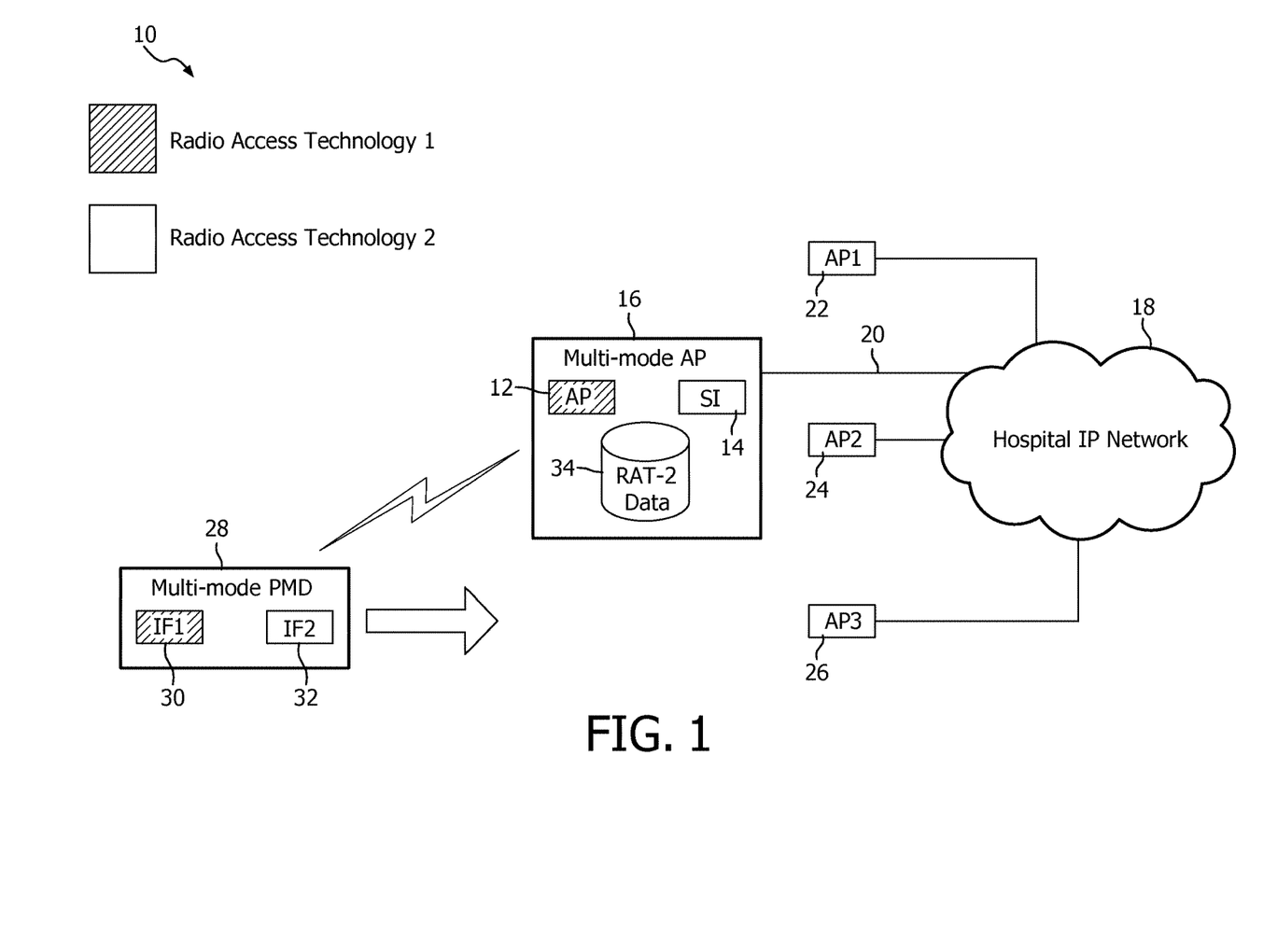
FIG. 1 illustrates a system that includes a co-located AP and SI in a multi-mode AP hardwired to a hospital IP network via a wired interface.

FIG. 1 illustrates a system 10 that includes a co-located AP 12 and SI 14 in a multi-mode AP 16 hardwired to a hospital IP network 18 via a wired interface 20. In one embodiment one or more SIs 14 for different RATs are physically co-located with the AP 12. The combined device is referred to herein as multi-mode AP 16. The hospital network 18 is coupled to a plurality of legacy APs, e.g., AP1 22, AP2 24, AP3 26, and so on. The legacy APs may be single mode APs (as illustrated), or one or more of the legacy APs may be multi-mode APs. A multi-mode PMD 28 has two or more RAT interfaces, IF1 30, and IF2 32, one of which is used at a given time to connect to the AP 12 of the multi-mode AP 16.

The multi-mode AP 16 collects information about RAT networks in its vicinity other than the RAT network used by the AP 12 and stores it in a database 34 located at the multi-mode AP. The multi-mode AP provides this stored information to multi-mode PMD: (1) by including the information in its beacon signal, or (2) upon request from the multi-mode PMD through special open system interconnection (OSI) network layer 2 frames (e.g., data link layer frames, frames similar to "Action" frames in IEEE 802.11, etc.) or higher layer frame exchanges. In one embodiment, the multi-mode AP 16 is connected to the hospital IP network 18 through a wired link 20. FIG. 1 shows a particular embodiment where the two interfaces IF1 and IF2 are designed for communication with a multi-mode AP and other APs using RAT-1 and RAT-2 respectively. The multi-mode AP contains the AP for RAT-1 communication and the SI for RAT-2 communication, while legacy APs 22, 24, 26 communicate using RAT-2.

In one embodiment, the multi-mode PMD is initially connected to the multi-mode AP using RAT-1 on a serving network. The multi-mode AP continuously or periodically transmits a beacon signal that includes information regarding candidate networks using RAT-2 communication protocols, such as the legacy APs 22, 24, 26. The information may include, for instance, AP identity information, communication protocol information, session initiation information, bandwidth availability information, etc. If the PMD determines that its RAT-1 communication link is weak (e.g., below a predetermined acceptable threshold level) and that one or more of the legacy RAT-2 APs, operating on one or more candidate networks, provides a better quality of service, then the PMD selects a candidate AP as a target AP, and switches over to RAT-2 communication with the target RAT-2 AP to continue to communicate with the hospital IP network. In this manner, the PMD is provided a constant communication link with the hospital IP network without having to expend power to actively search for and assess signal quality form multiple APs on candidate networks. Quality of service may be a function of, for instance, one or more of signal quality, bandwidth availability, link reliability etc., without being limited thereto.

In one embodiment, the PMD determines that its quality of service is below the predetermined threshold and requests the collected information regarding other available networks. In another embodiment, the PMD determines that its quality of service is below the predetermined threshold and searches for a beacon signal that includes the collected information regarding other available networks.

According to one embodiment, a patient coupled to a PMD may venture from a ward in which the patient is staying, which uses a RAT-1 network. As the patient approaches a perimeter of the RAT-1 network coverage area, the communication signal it is using becomes diminished, and the PMD requests information from the serving AP regarding other available RAT networks to which the PMD can switch to maintain communication with the hospital IP network. Alternatively, the PMD periodically or constantly receives such information over a beacon signal sent out by the serving AP. In this manner, the PMD need not expend resources (e.g., battery power, etc.) to actively search for other networks or APs.

It will be appreciated that each of the PMD, multi-mode AP, single mode AP, legacy APs, and the hospital IP network described in various embodiments and figures herein include a memory or computer-readable medium (not shown) that stores, and one or more processors (not shown) that execute, computer-executable instructions for performing the various functions, actions, steps, methods, etc., described herein. The memory may be a computer-readable medium on which a control program is stored, such as a disk, hard drive, or the like. Common forms of computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

Figure 2:
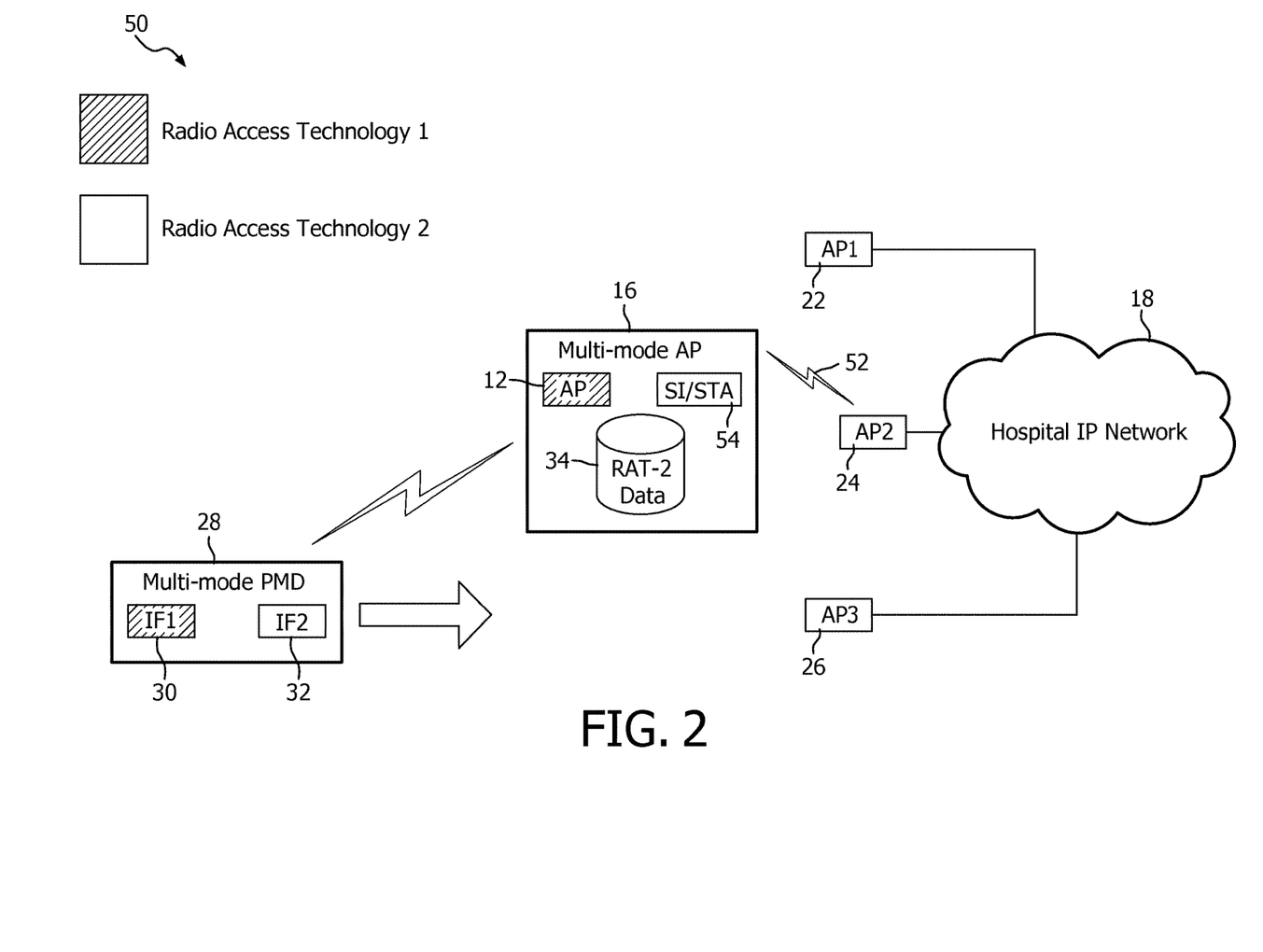
FIG. 2 illustrates a system that includes a co-located AP and scanning interface/wireless station (SI/STA) in a multi-mode AP wirelessly connected to a hospital IP network via a wireless interface STA (e.g., a wireless local area network or the like) to legacy AP2.

FIG. 2 illustrates a system 50 that includes a co-located AP 12 and SI/STA 54 in a multi-mode AP 16 wirelessly connected to a hospital IP network 18 via a wireless link 52 (e.g., a wireless local area network or the like) to legacy AP2 24. In one embodiment one or more SI/STAs 52 for different RATs are physically co-located with the AP 12 (e.g., on a common printed circuit board, within a single housing or unit, or the like). The hospital network is additionally coupled to a plurality of legacy APs 22, 24, 26, and so on. The legacy APs may be single mode APs (as illustrated), or one or more of the additional APs may be multi-mode APs. The multi-mode PMD 28 has two or more RAT interface, IF1 30, and IF2 32, one of which is used at a given time to connect to the AP 12 of the multi-mode AP 16. The multi-mode AP 16 collects information about RAT networks in its vicinity other than the one used by the AP 12, and stores it in a database 34 located at the multi-mode AP. The multi-mode AP provides this stored information (e.g., network information from the hospital IP network) to multi-mode PMD by including the information in its beacon signal or upon request from the multi-mode PMD through special layer 2 frames.

One of the non-AP interfaces of the multi-mode AP is configured as a station (STA) 54 in one of the non-AP RAT networks, allowing the multi-mode AP to act as a wireless proxy node. The PMD 28 contains two interfaces IF1 and IF2 for RAT-1 and RAT-2 communication, respectively. The multi-mode PMD initially may be connected to the multi-mode AP through RAT-1. The multi-mode AP includes the AP 12 for RAT-1 communication and an interface 54 for RAT-2 which serves as SI as well as STA.

Figure 3:
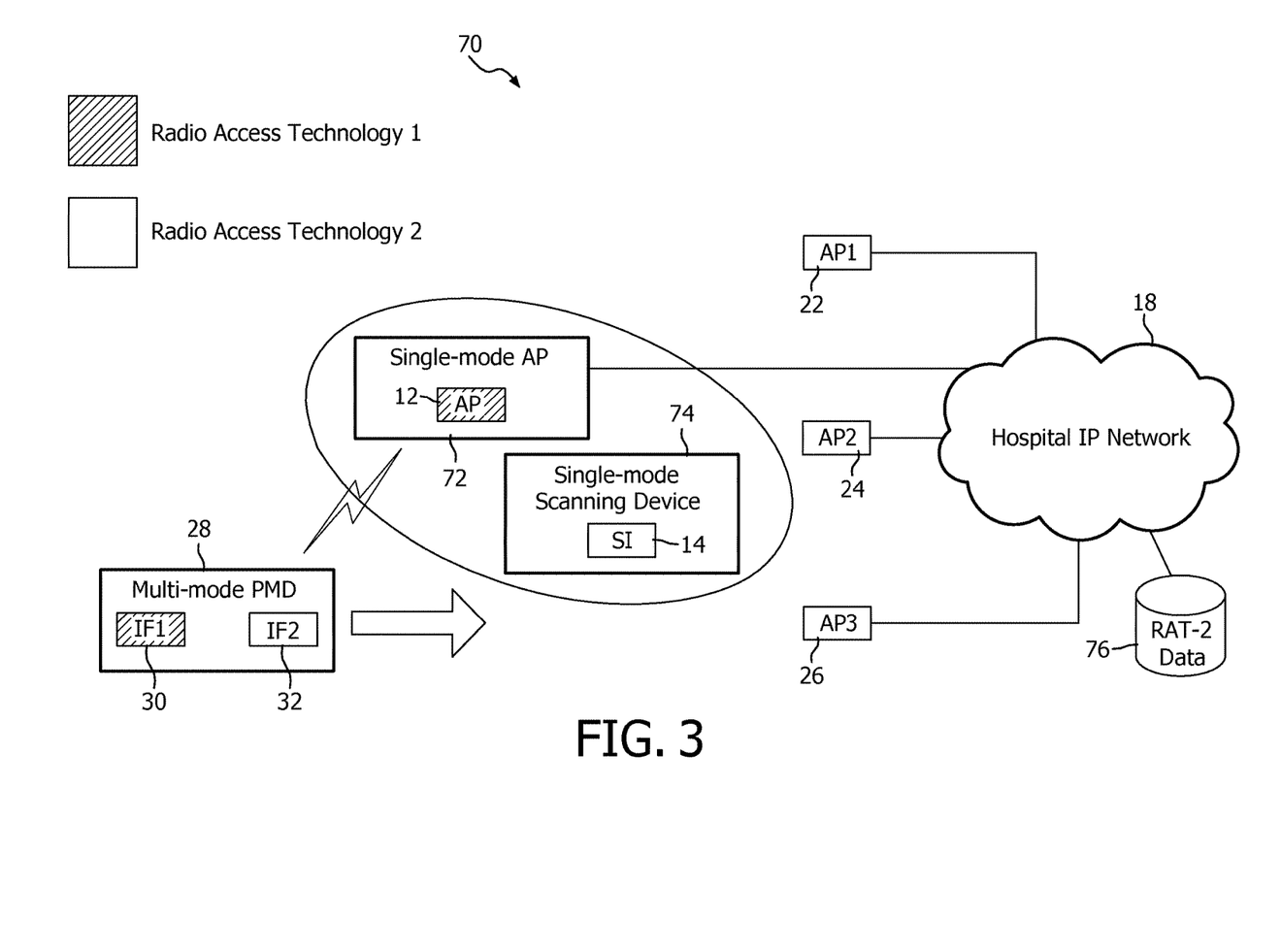
FIG. 3 illustrates a system with a single mode AP and a single mode scanning device (SD).

FIG. 3 illustrates a system 70 with a single mode AP 72 and a single mode scanning device (SD) 74. In one embodiment, the SI 14 is contained in a stand-alone SD 74 located or positioned in the vicinity of the single mode AP 72, which contains a single RAT interface AP 12. The single-mode AP 72 and the SD 74 are paired such that the SD 74 gathers RAT information from signals in the vicinity of the single mode AP 72. The single-mode AP contains a single interface (AP) 12 for a particular RAT (e.g., RAT-1) and the SD contains one interface (SI) 14 for different RAT (RAT-2). The hospital network 18 is coupled to a plurality of legacy APs, e.g., AP1 22, AP2 24, AP3 26, and so on. The legacy APs may be single mode APs (as illustrated), or one or more of the legacy APs may be multi-mode APs. A multi-mode PMD 28 has two or more RAT interface, IF1 30, and IF2 32, one of which is used at a given time to connect to the AP 12 of the single-mode AP 72 or to one of the legacy APs, respectively.

The SD creates a neighborhood map of RAT-2 networks in the vicinity of the single-mode AP. This information is stored in a database server 76 in the hospital network 18. In one embodiment, the AP 12 retrieves its neighborhood information from the database server 76 and provides this information to a multi mode PMD 28 by including the information in its beacon, or upon request from the multi-mode PMD through special "layer 2" frames or higher layer frames. In another embodiment, the multi mode PMD accesses the information directly from the database server 76 via the RAT-1 link to the AP 12.

Figure 4:
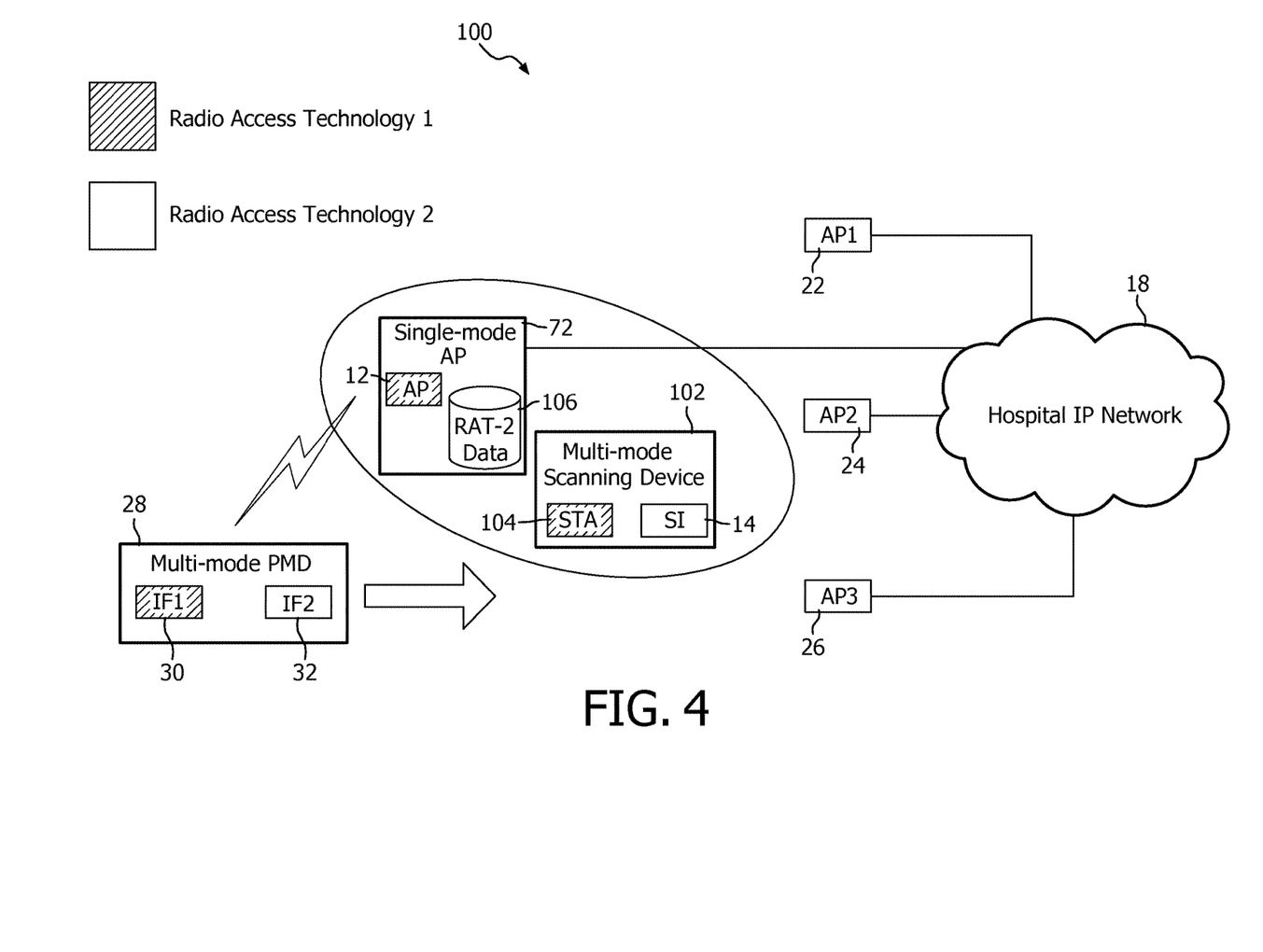
FIG. 4 illustrates a system with a single mode AP and a multi-mode scanning device that scans networks in the vicinity and collects information (e.g., identity, communication protocols, initiation protocols, etc.).

FIG. 4 illustrates a system 100 with a single mode AP 72 and a multi-mode scanning device 102 that scans networks in the vicinity and collects information (e.g., identity, communication protocols, initiation protocols, etc.). In one embodiment, the SI 14 is contained in a stand-alone multi-mode scanning device (SD) located in the vicinity of the single mode AP 72, which contains a single RAT interface AP 12. The single-mode AP 72 and the SD 74 are situated in close proximity to one another such that the SD 74 gathers RAT information from signals in the vicinity of the single mode AP 72. The single-mode AP contains a single interface (AP) 12 for a particular RAT (e.g., RAT-1) and the multi-mode SD contains one interface (SI) 14 for different RAT (RAT-2). The multi-mode SD also includes a non-AP interface that is configured as a station (STA) 104 in one of the non-AP RAT networks, allowing the multi-mode AP to act as a wireless proxy node. The hospital network 18 is coupled to a plurality of legacy APs, e.g., AP1 22, AP2 24, AP3 26, and so on. The legacy APs may be single mode APs (as illustrated), or one or more of the legacy APs may be multi-mode APs. A multi-mode PMD 28 has two or more RAT interface, IF1 30, and IF2 32, one of which is used at a given time to connect to the AP 12 of the single-mode AP 72 or to one of the legacy APs, respectively.

The SD creates a neighborhood map of RAT-2 networks in the vicinity of the single-mode AP. This information is stored in a database server 106 in the single-mode AP 72. In one embodiment, the AP 12 retrieves its neighborhood information from the database server 106 and provides this information to the multi mode PMD 28 by including the information in its beacon, or upon request from the multi-mode PMD through special layer 2 frames or higher layer frames. In another embodiment, the multi mode PMD accesses the information directly from the database server 106 via the RAT-1 link to the AP 12.

In another embodiment, the multi-mode SD contains two or more interfaces for different RATs, one of which is the RAT used by the single-mode AP. The multi-mode SD is connected to the single-mode AP through RAT-1. The single-mode AP retrieves the information for RAT-2 networks from the multi-mode SD and stores it in the local database 106. The single-mode AP 72 then provides this information to multi mode PMD by including the information in its beacon or upon request from the multi mode PMD through special layer 2 frames or higher layer frames.

Figure 5:
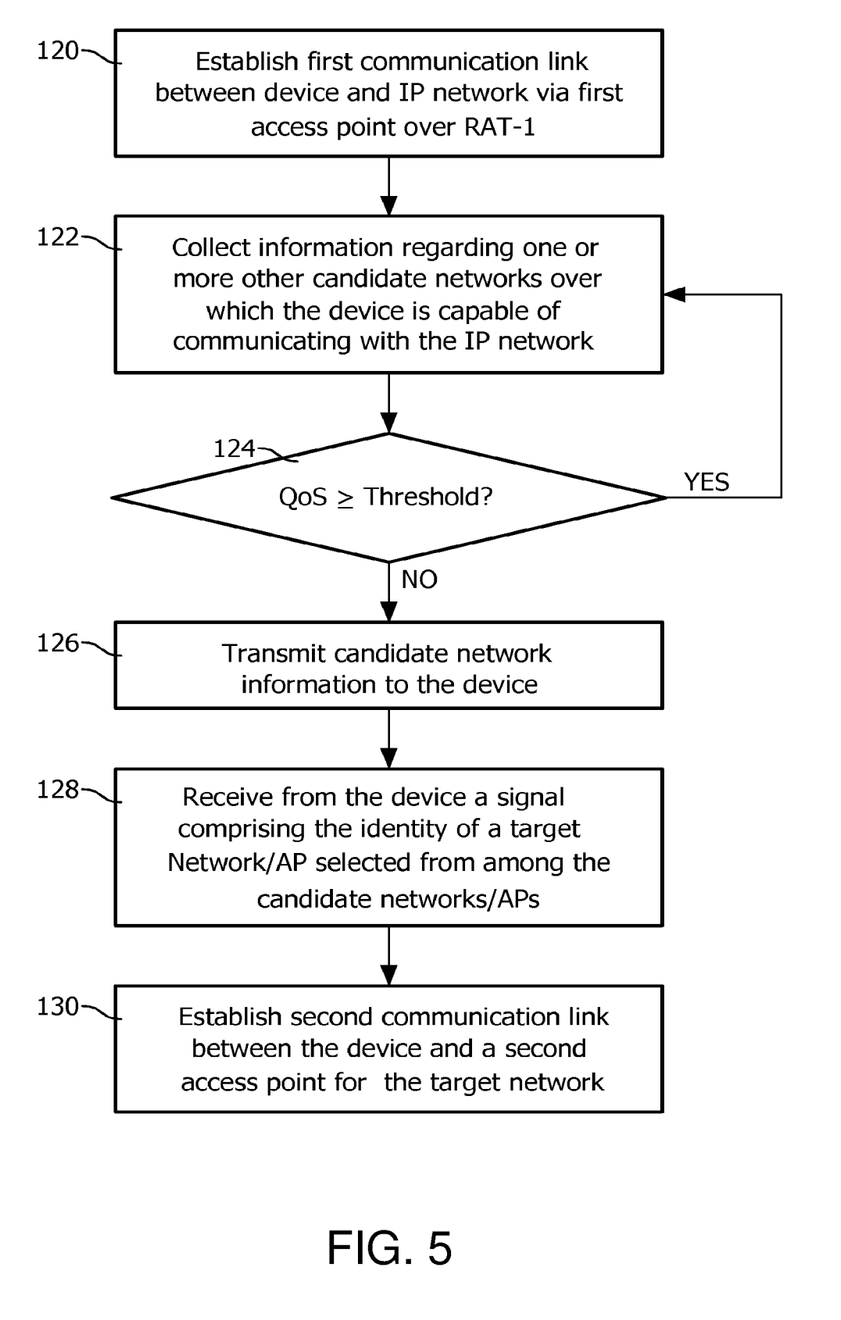
FIG. 5 illustrates a method for transferring a patient monitoring device between radio access technology (RAT) networks when the patient monitoring device detects that its current communication link has a quality of service below a predetermined threshold level.

FIG. 5 illustrates a method for transferring a patient monitoring device between radio access technology (RAT) networks when the patient monitoring device detects that its current communication link has a quality of service below a predetermined threshold level. At 120, a communication link is established between a multi-mode PMD and a first AP (e.g., a serving AP) over a first RAT network (RAT-1). The PMD communicates with a hospital IP network via the first access point, which may be multimode or single mode. At 122, information is collected regarding one or more other candidate networks (RAT-2) over which the PMD is capable of communicating with the hospital IP network. The RAT-2 network and/or access point information may be collected by a scanning interface (SI) in a multi-mode AP or positioned near a single-mode AP.

At 124, a determination is made regarding whether RAT-1 quality of service at the PMD is at or above a predetermined threshold level for reliable communication between the PMD and the AP. If so, then the method reverts to 122 for continued collection of RAT-2 network/AP information. If not, then at 126, candidate network and/or AP information is transmitted to the PMD. The candidate network/AP information can be transmitted from the SI directly, or relayed through the serving AP. At 128, the serving AP receives an indication or signal from the PMD regarding a selected (e.g., target) RAT-2 network/AP from among the candidate networks/APs. At 130, the PMD initiates a handoff of the PMD from the serving AP to the target AP. That is, a second communication link is established between the PMD and the target AP using a second radio network technology (RAT-2).

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A method of transferring a multi-mode patient monitoring device between radio access technology (RAT) networks, comprising:
    establishing a first communication link between the multi-mode patient monitoring device and a first access point over a first RAT network (RAT-1), wherein the multi-mode patient monitoring device communicates with a hospital Internet protocol (IP) network via the first access point;
    collecting, with a scanning device located remotely from the multi-mode patient monitoring device, candidate network information regarding one or more other candidate networks (RAT-2) over which the multi-mode patient monitoring device is capable of communicating with the hospital IP network, the candidate network information includes quality of service information comprising signal quality information, bandwidth availability information, and link reliability information, wherein only networks having access points providing a quality of service better than a quality of service for the first communication link are selected as the candidate networks wherein the quality of service is a function of the signal quality information, bandwidth availability information, and link reliability information;
    continuously transmitting the candidate network information from the scanning device to the multi-mode patient monitoring device; and
    establishing a second communication link between the multi-mode patient monitoring device and a second access point for the hospital IP network when the quality of service for the first communication link is below a predetermined threshold.

2. The method according to claim 1, wherein the RAT-1 network and at least one of the one or more other candidate RAT networks respectively employ different radio access communication protocols.

3. The method according to claim 1, wherein the first access point is a multi-mode access point capable of communicating over at least two different RAT networks.

4. The method according to claim 1, wherein the first access point is a single-mode access point capable of communicating over the first RAT network (RAT-1), and further comprising:
    pairing the single-mode access point with the scanning device.

5. The method according to claim 1, further including storing the candidate network information at in a database at one or more of:
    the hospital IP network; and
    the first access point.

6. The method of claim 1, wherein the candidate network information collected by the scanning device is transmitted to the patient monitor device using layer 2 frames adapted to carry the candidate network information, in response to a request from the patient monitoring device.

7. The method of claim 1, wherein the candidate network information collected by the scanning device is transmitted to the patient monitor device in a beacon signal emitted periodically from the first access point.

8. A non-transitory computer-readable medium carrying software for controlling a processor to configure and perform the method of claim 1.

9. A system that facilitates transferring a device between radio access technology (RAT) networks, the system comprising:
    a patient monitoring device (PMD) that establishes a first communication link with a first access point over a first RAT network (RAT-1), wherein the patient monitoring device communicates with a hospital Internet protocol (IP) network via the first access point; and
    a scanning interface configured to collect network availability information regarding one or more other candidate networks (RAT-2) over which the patient monitoring device is capable of communicating with the hospital IP network, wherein the scanning interface is located remotely from the patient monitoring device, the collected information including quality of service information comprising signal quality information, bandwidth availability information, and link reliability information, wherein the scanning interface selects the candidate networks only as networks having access points providing a quality of service better than a quality of service for the first communication link wherein the quality of service is a function of the signal quality information, bandwidth availability information, and link reliability information;
    wherein the first access point continuously relays the network availability information from the scanning interface to the patient monitoring device; and
    wherein a second communication link is established between the multi-mode patient monitoring device and a second access point for the hospital IP network when the quality of service for the first communication link is below a predetermined threshold.

10. The system according to claim 9, wherein the RAT-1 network and at least one of the one or more other candidate networks (RAT-2) respectively employ different radio access communication protocols, and wherein the first access point communicates the network availability information using the different radio access communication protocols.

11. The system according to claim 9, wherein the first access point is a multi-mode access point capable of communicating over at least two different RAT networks.

12. The system according to claim 9, wherein the first access point is a single-mode access point capable of communicating over the first RAT network (RAT-1), and wherein the scanning interface is positioned in close proximity to the single-mode access point.

13. The system according to claim 9, further including storing the availability information at in a database at one or more of:
    the hospital IP network; and
    the first access point.

14. The system according to claim 9, wherein the availability information collected by the scanning interface is transmitted to the patient monitor device using layer 2 frames adapted to carry the availability information, in response to a request from the patient monitoring device.

15. The system according to claim 9, wherein the availability information collected by the scanning interface is transmitted to the patient monitor device in a beacon signal emitted periodically from the first access point.

16. An apparatus that facilitates transferring a device between radio access technology (RAT) networks, comprising:
   means for establishing and maintaining a first communication link using a first RAT network between a patient monitoring device and first access point of a hospital Internet protocol (IP) network via the means for establishing and maintaining the first communication link;
   means for collecting candidate network information regarding one or more candidate networks using a second radio access technology (RAT-2) over which the patient monitoring device is capable of communicating with the hospital IP network, wherein the means for collecting is located remotely from the patient monitoring device, the candidate network information including quality of service information comprising signal quality information, bandwidth availability information, and link reliability information, wherein only networks having access points providing a quality of service better than a quality of service for the first communication link are selected as the candidate networks wherein the quality of service is a function of the signal quality information, bandwidth availability information, and link reliability information;
   means for continuously transmitting the candidate network information to the patient monitoring device;
   means for establishing and maintaining a second communication link between the patient monitoring device and a second access point for the hospital IP network when the quality of service for the first communication link is below a predetermined threshold.

17. The apparatus according to claim 16, wherein the first access point is at least one of:
   a multi-mode access point capable of communicating over at least two different RAT networks,
   a single-mode access point capable of communicating over the first RAT network (RAT-1), with a scanning device that collects the candidate network information regarding the one or more other candidate networks (RAT-2);
   wherein the collected information is transmitted to the patient monitor device in at least one of:
   layer 2 frames adapted to carry the information, in response to a request from the patient monitoring device; or
   a beacon signal emitted periodically from the first access point.

* * * * *